United States Patent [19]
Lindley

[11] 4,291,486
[45] Sep. 29, 1981

[54] RODENT TRAP

[75] Inventor: Donald C. Lindley, Long Beach, Calif.

[73] Assignee: Farnam Companies, Inc., Phoenix, Ariz.

[21] Appl. No.: 98,728

[22] Filed: Nov. 30, 1979

[51] Int. Cl.³ ............................................. A01M 23/16
[52] U.S. Cl. ................................................ 43/61; 43/62
[58] Field of Search ..................... 43/58, 60, 61, 62, 68

[56] References Cited

U.S. PATENT DOCUMENTS

| | | | |
|---|---|---|---|
| 491,309 | 2/1893 | Herman | 43/60 |
| 1,262,946 | 4/1918 | Harriman | 43/61 |
| 1,587,536 | 6/1926 | Lobit | 43/61 |
| 1,650,458 | 11/1927 | McDonald | 43/62 |
| 3,733,735 | 5/1973 | Hirsch | 43/61 |
| 3,823,504 | 7/1974 | Dosch | 43/61 |
| 3,975,857 | 8/1976 | Branson | 43/61 |
| 4,127,958 | 12/1978 | Peters | 43/81 |
| 4,231,180 | 11/1980 | Bare | 43/61 |
| 4,238,903 | 12/1980 | Mazzei | 43/61 |

Primary Examiner—Robert C. Watson
Assistant Examiner—Robert P. Olszewski
Attorney, Agent, or Firm—LaValle D. Ptak

[57] ABSTRACT

A low-cost, environmentally safe rodent trap is disclosed composed generally of a pair of coaxial telescoping cylinders including an internally actuated trigger mechanism which supports one of the cylinders at an elevated height within the other cylinder. Upon reaching the bottom of the elevated cylinder, the weight of the rodent actuates the trigger mechanism, causing the elevated cylinder to fall whereby a cap attached to the upper end of the elevated cylinder sealingly engages the other cylinder to suffocate the rodent. The cylinders are housed within a box-like platform which provides easy ingress of the rodent to the trap, ensures stability during operation, prevents viewing of the rodent carcass, and provides for marketing of the trap without additional packaging material.

8 Claims, 11 Drawing Figures

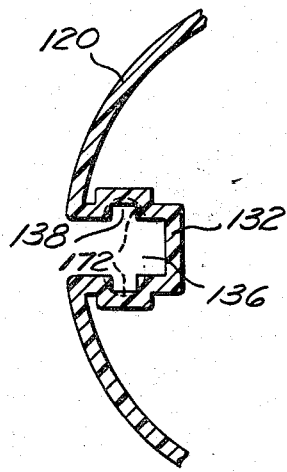
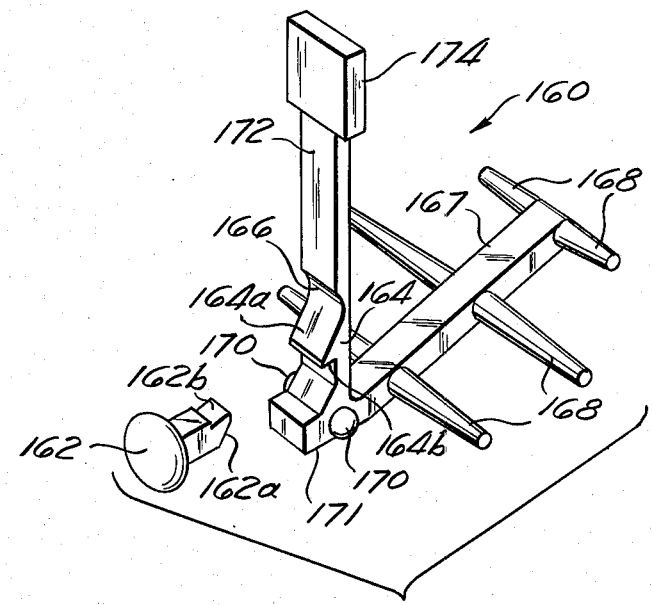
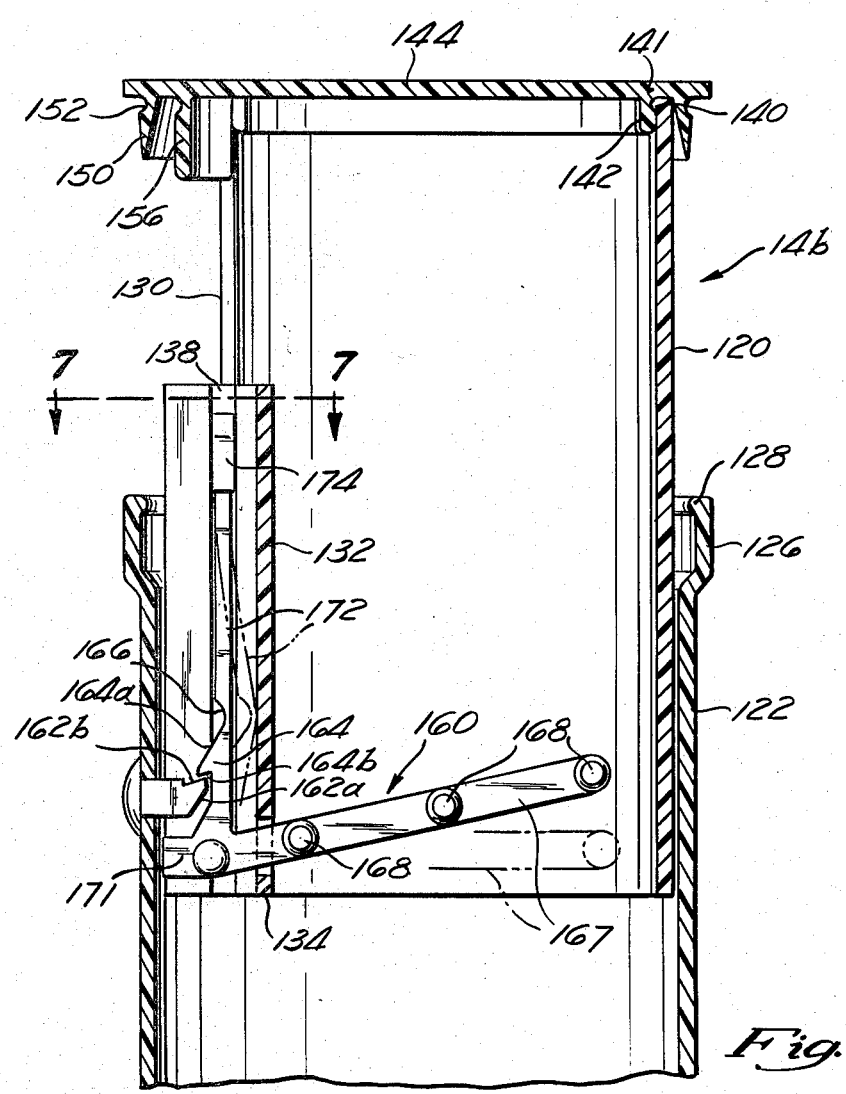
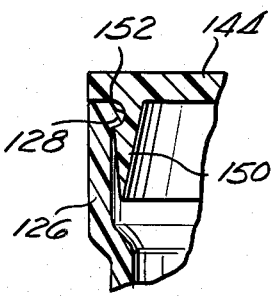

RODENT TRAP

BACKGROUND OF THE PRESENT INVENTION

The present invention relates to traps for rodents, and more particularly to mouse traps which are environmentally safe to use, relatively inexpensive to manufacture, and permit the entrapment, killing, and disposal of the rodent in a sanitary manner without actual viewing of the rodent carcass.

The elimination of rodents from household residences and the like has long been recognized, with a variety of mechanical devices, chemical compounds, and extermination techniques currently available in the marketplace. While these various devices and compounds have proven generally effective in their desired function, they have typically been inconvenient in use, posed significant safety hazards to the user, or have caused ecological damage to the environment.

The majority of conventional mousetrap devices have incorporated various trigger-actuated spring mechanisms which, upon detecting the presence of a rodent, violently impinge upon the rodent, leaving exposed the unsightly as well as usually odorous carcass which must be subsequently removed by the user. As is all too well known, the removal of the carcass from the trap is typically an unpleasant task and occasionally subjects the user to various germs and diseases carried by the rodent or rodent parasites. Additionally, such conventional traps are incapable of distinguishing between the presence of a rodent and that of small children or house pets, thereby posing a significant safety hazard during use.

Although the more recent box-type or cage-type prior art traps have reduced the threat of injury to the user, they typically have been expensive to manufacture and have failed to remedy the problem encountered in disposing of the rodent carcass. Additionally, such cage traps often utilize a spring trigger mechanism which may be accidentally actuated by the rodent prior to entry into the cage, thereby failing to perform its desired function.

The chemical compounds and extermination techniques heretofore utilized have comprised highly toxic chemicals such as fumigants and anti-coagulants which pose an even greater safety hazard to the user, small children, and household pets. Further, such chemicals usually retain their toxicity for extended periods of time, the environmental impact of which has only recently been recognized and not yet fully understood.

As such, there exists a substantial need for a relatively low-cost rodent trap which eliminates the inconvenience, safety, and environmental deficiencies heretofore found in prior art apparatus and chemical compounds.

SUMMARY OF THE PRESENT INVENTION

The present invention comprises a low-cost, preferably disposable mousetrap which specifically eliminates the inconvenience, safety and disposal problems associated with the prior art rodent trap devices and chemical compounds. This result is made possible by utilizing a simple, yet effective, structure which takes advantage of the rodent's own body weight and natural curiousity to capture and kill the rodent.

The improved rodent trap of the present invention comprises a pair of differing size containers, preferably cyclinders which are oriented coaxially with one another and adapted for reciprocal telescoping movement. The inner cylinder is provided with an aperture adjacent its upper end, sized to permit entry of a mouse or the like therein, and includes an internally actuated trigger mechanism adjacent its lower end. The outer cylinder is provided with a closed bottom having a piece of rodent bait positioned thereon and includes a tab or stop member on its interior surface which cooperates with the trigger mechanism to releasably maintain the inner cylinder at an elevated height from the bottom surface of the outer cylinder.

Mice, being naturally curious animals, will protrude their head through the aperture in the inner cylinder and, after noticing and/or smelling the bait on the bottom of the outer container, will enter the inner cylinder. The weight of the mouse on the bottom of the inner cylinder will produce a force to retract the trigger mechanism from the stop, causing the inner cylinder with the mouse therein, to fall within the outer cylinder. During this falling movement, an end cap positioned on the upper end of the inner cylinder contacts the upper end of the outer cylinder forming an air-tight seal which, after a sufficient period of time, reduces the oxygen level and increases the temperature within the trap which kills the mouse.

Due to the present invention's use of the rodent's own weight to cause the trap to close, rather than spring actuated clamping mechanisms utilized in the prior art, the invention completely eliminates any possibility of injury to the user or small children. Further, due to the trigger mechanism of the present invention being actuated only from within the interior of the inner cylinder, accidental triggering of the device prior to entry of the rodent is eliminated.

Additionally, the present invention provides a box-like platform which supports the two cylinders and forms an access ramp to assist the rodent to enter into the device. Further, the box-like platform is opaque so as to eliminate the unpleasant viewing of the rodent carcass and is specifically adapted to provide a convenient self-contained packaging means, thereby permitting the marketing of the trap without the need of additional packaging materials.

DESCRIPTION OF THE DRAWINGS

These, as well as other features of the present invention, will become more apparent upon reference to the drawings wherein:

FIG. 6 is a cross-sectional view of a second embodiment of the rodent trap of the present invention removed from the box-like support structure of FIG. 1;

FIG. 7 is a cross-sectional view of the inner cylinder of the second embodiment of the present invention taken about lines 7—7 of FIG. 6;

FIG. 8 is a perspective view of the trigger mechanism removed from the inner cylinder of FIG. 6; and FIG. 9 is an enlarged partial cross-sectional view of the air-tight seal formed when the trap is in a closed position.

DETAILED DESCRIPTION OF THE FIRST EMBODIMENT

Figure 1:
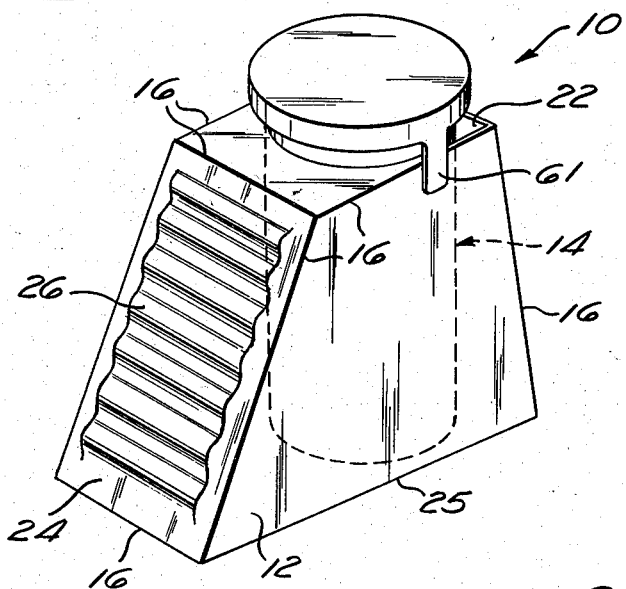
FIG. 1 is a perspective view of a first embodiment of the rodent trap of the present invention showing the box-like platform structure and the orientation of the co-axial cylinders therein.

Referring to FIG. 1, there is shown a first embodiment of the rodent trap 10 of the present invention composed generally of a box-like support structure 12, which houses a cylinder/end closure assembly 14 therein. The support structure 12 is preferably fabricated from an opaque paperboard stock, and is articulated about a plurality of preferential fold lines 16 to assume a generally trapezoidal-shaped configuration, wider at the bottom than at the top, to provide stability to the trap.

The top surface 18 of the support structure 12 includes a semi-circular aperture 20 which is spaced from the rear surface 22 of the structure 12 to tightly receive the cylinder/end closure assembly 14 therein. The frontal surface 24 of the support structure 12 is disposed at an angular inclination to the bottom surface 25 and is provided with a corrugated central section 26 specifically adapted to provide an irregular surfaced ladder-like approach ramp assending to the top surface 18 of the trap 10. As an inexpensive alternative ladder means, holes may be formed in the surface 24.

Figure 2:
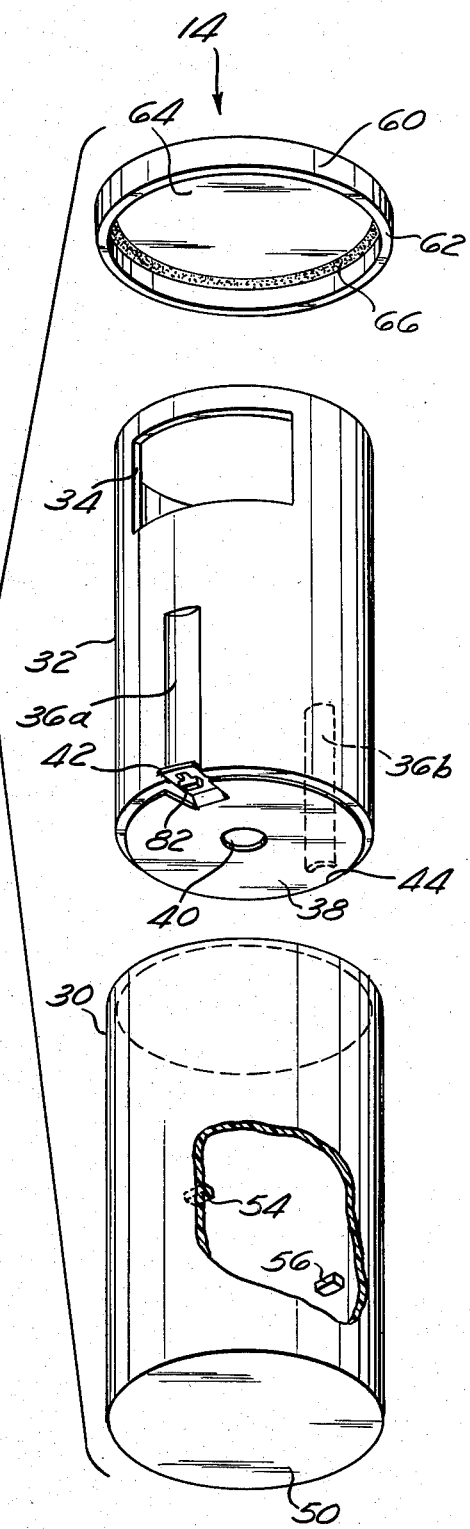
FIG. 2 is an exploded perspective view of the inner and outer cylinders of the rodent trap of FIG. 1.

Referring to FIG. 2, the assembly 14 includes a pair of tabular members or containers in the form of an outer cylinder 30 and an inner cylinder 32, the diameters of which are dissimilarly sized to permit telescoping movement of the inner cylinder 32 within the outer cylinder 30. Preferably, the cylinders 30 and 32 are formed of a high-density plastic which possesses sufficient strength to resist the teeth of the rodents and may be readily formed into the desired tubular configuration.

The inner cylinder 32 is provided with an enlarged rectangular aperture 34 adjacent its upper end, which is sized to permit a rodent to enter the cylinder. A pair of elongate recesses or guide channels 36a and 36b are formed on the inner cylinder 32, preferably being positioned at 180 degrees from one another. As shown, both of the channels 36a and 36b extend axially through a substantial portion of the cylinder 32 with the channel 36a initiating at the bottom end of the cylinder 32 whereas the channel 36b initiates slightly above the lower end of the cylinder 32, being separated therefrom by a small arcuate portion 44 of the inner cylinder 32.

The outer cylinder 30 is provided with a bottom wall 50, and includes a pair of tabs or stops 54, and 56, which protrude a short distance radially inward on the interior surface of the cylinder 30. The tabs 54 and 56 are aligned and sized to be received within the guide channels 36a and 36b respectively of the inner cylinder 32 and are vertically offset from one another so that the tab 56 is positioned a short distance vertically above the tab 54 (shown in FIG. 4).

In the preferred embodiment, each of the tabs 54, and 56 are formed of an elastomeric material which may be moderately flexed to permit the arcuate portion 44 of the inner cylinder 32 to pass downward beneath the tab 56 during initial insertion of the inner cylinder 32 within the outer cylinder 30. As will be recognized, once initially inserted therein, the inner cylinder 32 may be freely reciprocated within the outer cylinder 30 throughout the distance defined between the bottom wall 50 and the stop 56, with the cylinder 32 restrained from rotational movement by the cooperation of the tabs 54, 56 in the guide channels 36a and 36b.

The inner cylinder 32 is additionally provided with an end closure or cap 60 rigidly mounted to its upper-most end. The end cap 60 includes an annular flange 62, the inside diameter of which is slightly greater than the outside diameter of the outer cylinder 30. The under surface 64 of the end cap 60 is preferably provided with a mastic-like sealing substance 66, such as a silicon gel, positioned about the inner diameter of the flange 62. By such an arrangement, when the inner cylinder 32 is located in its lower-most position within the outer cylinder 30, the sealing gel 66 of the end cap 60 contacts the upper end of the cylinder 30 forming a liquid-tight seal thereabout. To selectively maintain the cylinders 32 in this lower-most position, a thin strap section 61, preferably formed as an integral portion of the end closure 60, may be affixed to a portion of the box structure 12 as by way of an adhesive.

As shown in FIG. 2, the lower end of the inner cylinder 32 is provided with a disk-like trigger plate 38 having a small central aperture 40 formed therein. The trigger plate 38 is pivotally mounted as by way of adhesive to the small arcuate portion 44 of inner cylinder 32 and includes a latch member 42 adapted to releasably engage the stop or tab member 54 positioned on the interior of the outer cylinder 30. The trigger plate 38 is preferably formed with a relatively stiff yet moderately flexible plastic material, such as polyethylene, and is sized such that its outside diameter is equal to or slightly less than the outside diameter of the inner cylinder 32.

Figure 3A:
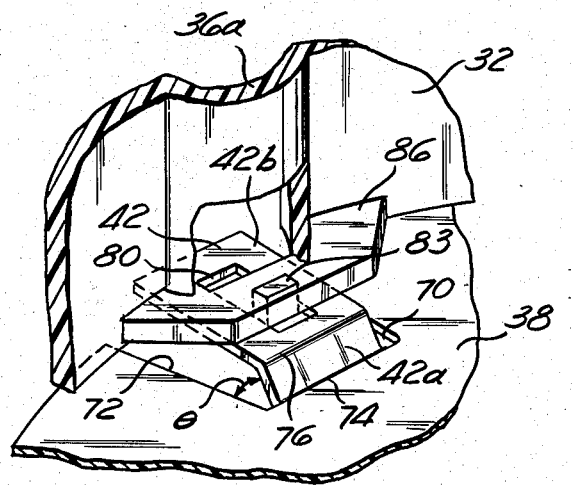
FIG. 3A is an enlarged partial perspective view of the top surface of the internally actuated trigger mechanism utilized in the 1st embodiment of the present invention.
Figure 3B:
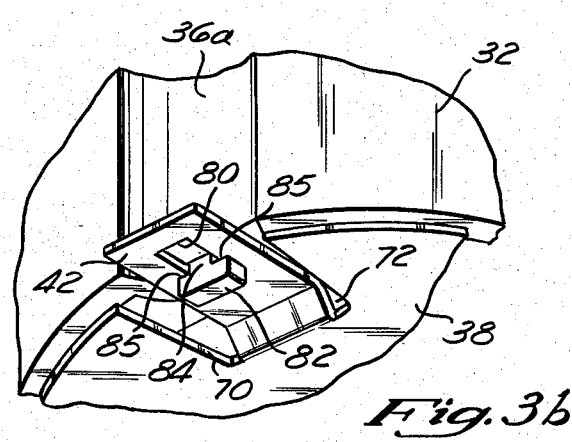
FIG. 3B is an enlarged partial perspective view of the bottom surface of the trigger mechanism of FIG. 3A.

As shown in FIGS. 3A and 3B, the latch member 42 is formed as an integral portion of the trigger plate 38 being delineated therefrom by a pair of slots 70 and 72 which extend radially inward from the edge of the trigger plate 38. The latch member 42 is permanently bent about a pair of score lines 74 and 76 to assume a generally L-shaped configuration, the shorter leg of which 42a extends angularly upward above the plane of the trigger plate 38 while the longer leg 42b is disposed in a plane substantially parallel to the plane of the trigger plate 38.

The longer leg 42b of the latch member 42 is sized to normally extend radially outward slightly beyond the circumference of the inner cylinder 32 and is provided with a centrally located rectangular aperture 80. The aperture 80 is formed slightly greater in width than a stem section 84 of a T-shaped retainer member 82 which is inserted through the aperture 80 from the under surface of the latch member 42 and press-fit into a mating aperture 83 formed on a mounting flange 86 extending radially inward from the lower surface of the inner cylinder 32. The upper shoulder surfaces 85 of the T-shaped member 82 are spaced from the lower surface of the mounting flange 86 at a distance slightly greater than the thickness of the latch member 42 such that the latch member 42 may freely reciprocate radially inward throughout the length of the rectangular aperture 80.

By such an arrangement, it will be recognized, upon encountering a downward force upon the trigger plate 38, the plate 38 will pivot about the arcuate portion 44 (FIG. 2) causing the portion of the plate member 38 located adjacent the latch member 42 to move vertically downward. This vertical downward movement causes the shorter section 42a of the latch member 42 to pivot about the score lines 74 from its initial angular orientation designated by the symbol theta $\theta$ (FIG. 3) to a greater angle approaching 90 degrees. During the increase in the angle theta $\theta$, the longer portion 42b of the latch member 40 moves radially inward throughout the length of the aperture 80 causing its distal end to reciprocate inward beyond the outer surface of the inner cylinder 32. Alternatively, upon the discontinuation of the downward force, the internal resiliency of the plastic material of the trigger plate 38 and latch member 42 causes the shorter member 74 to return to its initial angular orientation of theta $\theta$ and the distal end of the longer section 42b to again move outboard of the diameter of the inner cylinder 32.

Figure 4:
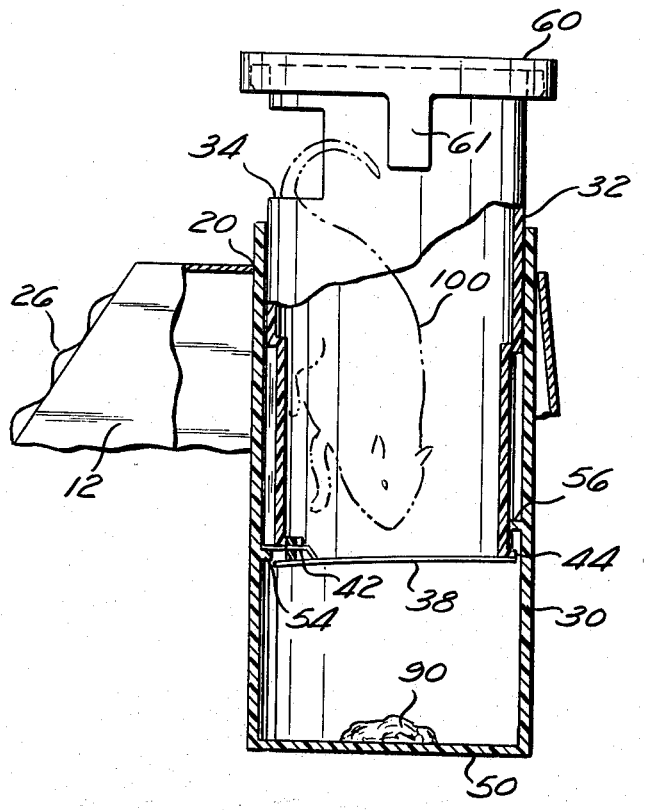
FIG. 4 is an enlarged partial cross-sectional view of the rodent trap of FIG. 1 depicting the inner cylinder raised above the lower surface of the outer cylinder.

With the structure defined, the initial set-up and operation of the first embodiment of the trap 10 of the present invention may be described. It will be recognized that the present invention may be provided during manufacture with a small piece of bait 90 positioned upon the end panel 50 within the outer cylinder 30 and may be marketed directly to the consumer in the sealed configuration depicted in FIG. 1. When it is desired to actuate the trap 10, the user need only lift the adhesive strap 61 from the support base 12 and manually lift the end cap 60 in a vertical direction. As shown in FIG. 4, this manual lifting causes the inner cylinder 32 to reciprocate upward within the interior of the outer cylinder 30 thereby exposing the access aperture 34 of the inner cylinder 32 above the top end of the outer cylinder 30.

The inner cylinder 32 is raised upward until the latch member 42 passes over the lower-most stop 54. Due to the moderate material resiliency of latch member 42 and stop member 54, the latch member 42 may pass over the stop 54 without being permanently deformed. Additional vertical raising of the inner cylinder 32 causes the portion 44 of the cylinder 32 to abut the tab 56 which provides sufficient resistance to further vertical travel to indicate to the user that the lifting force should be discontinued.

With the lower end of the cylinder 32 raised above the lower-most stop 54, the latch member 42 springs back to its normal position wherein the distal end of the latch member 42 rests upon the top surface of the tab 54 and supports the inner cylinder 32 at the elevated height depicted in FIG. 4. In this position, the rodent trap 10 is ready for use and may be placed in a desired location in which rodents are known to be present by the user.

A mouse 100, being a curious animal, will approach the trap 10 and ascend toward the top surface or platform 18, crawling up the corrugated surface 26 of the front panel 24. Upon inspecting the interior of the cylinder 32 through the aperture 34, the mouse 100 will smell and notice the bait 90 through the viewing aperture 40 formed in the trigger plate 38 and subsequently enter the inner cylinder 32 thereby contacting the trigger plate 38, as shown in FIG. 4.

Figure 4A:
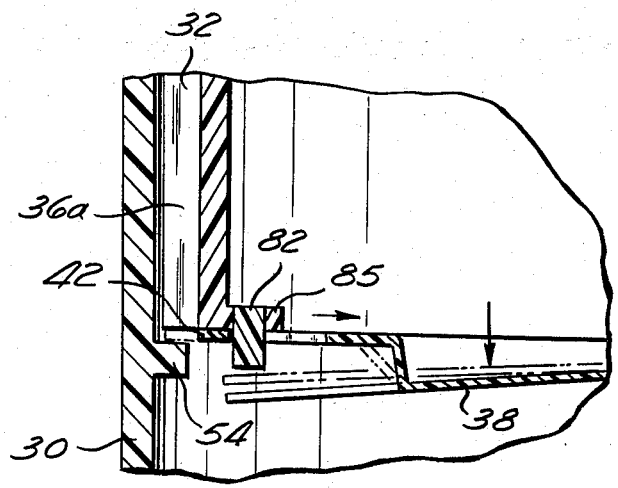
FIG. 4A is an enlarged partial cross-sectional view of the actuation of the trigger mechanism of FIGS. 3A and 3B.

The momentary increased weight of the mouse 100 upon the trigger plate 38 causes the plate 38 to pivot downward about the portion 44 of the cylinder 32 (FIG. 2) moving from its initial position, indicated by the phantom lines in FIG. 4A, to a lower stressed position, indicated by the solid lines of FIG. 4A. Due to the latch member 42 being restrained from downward movement by the shoulders 85 of the T-shaped retainer member 82 (represented by a phantom line in FIG. 4A), during this downward movement of the pivot plate 38, the angularly inclined shorter leg 42a of the pivot member 42 rotates from its phantom line position to its full line position in FIG. 4A thereby retracting the distal end of the longer leg 42a off of the stop 54.

The weight of the mouse 100 immediately causes the inner cylinder 32 to fall rapidly, whereby the end closure 60 extends over the upper end of the outer cylinder 30. Due to the silicon gel 66 being positioned on the under surface 64 of the closure 60, an air-tight seal is formed across the top end of the outer cylinder 30 which, after a short period of time, reduces the oxygen level and increases the temperature within the cylinder 30 killing the mouse. The user, noticing that the end cap 60 is in a lowered position, may slightly shake the trap to determine whether the mouse 100 is inside, and subsequently reposition the tab 61 on the support structure 12 and dispose of the entire trap 10 without viewing or contacting the mouse carcass. If desired, the trap can be reused by lifting the inner container to expose the opening 34 and then remove the mouse.

It is an important feature of the present invention that the trigger plate 38 and latch member 42 can be actuated only from the interior of the inner cylinder 32. Although the latch member 42 and stop 54 are formed of a material having internal resiliency to permit the latch 42 to pass over the stop 54 during the manual lifting of the inner cylinder 32, they both possess sufficient stiffness to support the inner cylinder 32 at an elevated height even when moderate downward pressure is applied to the end closure 60. As such, a mouse, during his initial inspection of the trap 10, may walk upon the top end closure 60 without causing the latch member 42 to deform and slip off of the stop 54. Thus, the trap is substantially free from false actuation until the rodent actually engages the trigger plate 38.

Figure 5:
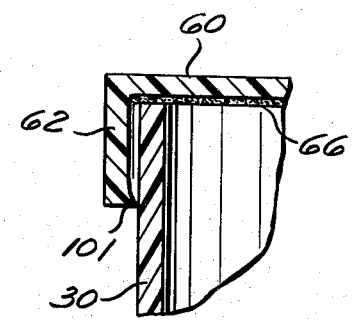
FIG. 5 is an enlarged partial cross-sectional view of the end cap of FIG. 2 depicting a manner in which an air-tight seal is formed on the upper end of the outer cylinder.

In FIG. 5, an alternative embodiment of the end closure 60 is shown. As in the previous embodiment, the end closure 60 is provided with a silicon gel 66 adapted to sealingly engage the upper end of the outer cylinder 30. However, in this alternative embodiment, the annular flange 62, depending from the end cap 60, is provided with a thin annular feather-like protrusion 101, the diameter of which is formed slightly smaller than the outer diameter of the exterior cylinder 30. Due to the extreme thinness of the protrusion 101, upon contacting the upper end of the cylinder 30 during downward closing movement, the annular protrusion 101 readily deforms vertically upward and seals against the outside diameter of the cylinder 30. As such, even if a moderate air gap is formed within the silicon gel 66, the protrusion 101 provides an air lock which will kill the rodent after a short period of time.

DETAILED DESCRIPTION OF A SECOND EMBODIMENT

Referring to FIG. 6, there is shown a second embodiment of the cylinder/end cap assembly 14b of the present invention, which for purposes of illustration has been removed from the box-like support structure 12 of FIG. 1. The cylinder/end cap assembly 14b includes an inner and outer cylinder 120 and 122 respectively, which as in the first embodiment, are dissimilarly sized and adapted for relative telescoping movement. The outer cylinder 122 is formed having a closed lower end (not shown) and includes an enlarged diameter section 126 at its upper end. The innermost edge of the section 126 is provided with an annular bead rim 128 which extends about the entire interior circumference of section 126.

The inner cylinder 120 is formed in an open-ended tubular configuration including an aperture 130 adjacent its upper end, sized to permit ingress of a mouse into the cylinder 120. A guide channel 132 is provided along a portion of the cylindrical wall of the inner cylinder 120 extending in an axial direction from the aperture 130 to the lower end 134 of the cylinder. As best shown in FIG. 7 the guide channel 132 is fabricated in a substantially T-shaped or cruciform configuration, defining a guide slot 136 which extends radially inward from the outer wall of the inner cylinder 120 and retaining groove 138 oriented perpendicular to the slot 136 and located approximately midway along the length thereof.

The upper end of the inner cylinder 120 additionally includes an annular bead rim 140 which extends a short distance radially inward. As shown in FIG. 6 the bead rim 140 engages a mating recess 141 of an annular flange 142 integrally depending from an end cap or cover 144. By such an arrangement it will be recognized that the end cap 144 may be snapped onto the uppermost end of the inner cylinder 120 thereby being rigidly maintained thereon.

The end cap or cover 144 is provided with a tapered sealing flange 150 adjacent its outer diameter and is positioned to be registered with the enlarged diameter flange section 126 of the outer cylinder 122. The sealing flange 150 includes an annular recess 152 at its uppermost end which is sized to mate with the bead rim 128 formed on the upper end of the outer cylinder 122. Due to the relatively thin cross-section of the sealing flange 150, during lowering of the inner cylinder 120 within the outer cylinder 122 (in a manner to be described infra) the sealing flange 150 contacts the upper end of the enlarged diameter flange section 126 and flexes a short distance radially inward, allowing entry of the bead rim 128 within the recess 152, and subsequently flexes back to its initial unstressed position forming an air-tight seal across the upper end of the outer cylinder 124. The end cap 144 is additionally provided with a short deflector 156 which depends a short distance into the aperture 130. This deflector 156 prevents the tail of the mouse (not shown) from extending across the open end of the outer cylinder 124 which might prevent complete closure of the trap during actuation.

The lower end of the inner cylinder 120 pivotally mounts a trigger or lever 160 which selectively engages a stop 162 press-fit through the cylindrical wall of the outer container 124 and aligned within the guide slot 136 of the guide channel 132. As best shown in FIG. 8, the trigger 160 is generally L-shaped having a vertical leg which includes a latch 164 and a hinge section 166, and a horizontal leg with a grid-like structure formed by the plural peg members 168. At the junction 171 of the vertical and horizontal legs, the trigger 160 is provided with a pair of ball-like protrusions 170 which are sized to be received within a mating pair of recesses 172 formed adjacent the lower end of the guide channel 132.

The vertical leg of the trigger 160 includes an elongate lower section 172 and an enlarged upper end section 174, the thickness of which are both sized slightly less then the thickness of the retaining groove 138 of the guide channel 132. As such, the vertical leg of the trigger 160 may be slidingly positioned within the retaining aperture 138 from the lower end thereof, and maintained in position by the pivotal cooperation of the ball-like protrusions 170 within the mating recesses 172 formed in the lower end of the guide channel 132. The width of the end section 174 is slightly greater than the width of the guide slot 136 such that the end portion 174 is continuously maintained within the retaining groove 138, while the width of the lower section 172 is slightly less than the width of the retaining aperture section 136 such that the lower section may selectively extend radially inward within the guide aperture 136.

By such an arrangement it may be recognized that the application of a downward force upon any of the peg members 168 of the horizontal leg 167 of the trigger 160 will cause the leg 167 to pivot in a clockwise direction (as viewed in FIG. 6) about the ball-like protrusions 170. This pivotal motion generates a corresponding pivotal force applied to the vertical leg of the trigger 160 which is resisted by the engagement of the end section 174 within the retaining groove 138 and the internal resiliency of the hinge section 166 formed on the vertical leg. When the pivotal force generated by the downward motion of the horizontal leg overcomes the internal resiliency of the hinge section 166, the trigger section 172 flexes or buckles radially inward about the hinge section 166 (as depicted by the phantom lines in FIG. 6) causing the latch 164 to retract radially inward within the guide slot 136 of the guide channel 132. As will be recognized, to accommodate this inward buckling of the elongate section 172, the end section 174 simultaneously moves a short distance axially downward within the retaining groove 138.

Upon the discontinuation of the downward force applied to the horizontal leg 167, the internal resiliency of the hinge section 166 causes the section 172 to return to its normal unstressed position (as indicated by the solid lines in FIG. 6) whereby the latch 164 moves radially outwardly so that the stop 162 is in path of the latch when the inner cylinder 120 moves vertically.

In operation of the trigger of FIG. 6, the trap is set by manually lifting the inner cylinder 120 upwardly within the outer cylinder 122. Due to the upper surface 164a of the latch 164 and lower surface 162a of the stop member 162 being formed in a matching angular configuration, during this upward movement, the latch 164 cams against the stop member 162 and flexes a short distance radially inward to pass over the stop member 162. Further vertical raising of the inner cylinder 120 is resisted by contact of the junction 171 of the trigger 160 against the stop 162, which provides sufficient resistance to indicate to the user that the lifting force should be discontinued.

With the latch 164 raised above the stop 162, the internal resiliency within the hinge section 166 causes the latch 164 to return to its unstressed position and rest on the inner end of the stop 162, thereby maintaining the inner cylinder 120 at a raised elevation within the outer cylinder 122. The lower surface 164b of the latch member 164 and upper surface 162b of the stop member 162 are formed having mating angular inclinations so that the application of the downward force on the top end closure 144 causes the trigger 160 to attempt to pivot in a counterclockwise direction whereby the latch 164 is merely more firmly seated upon the stop member 162.

As such, the trap eliminates any tendency for false actuation caused by the application of an external closing force as by a mouse (not shown) walking upon the top end cap 144.

With the inner cylinder 120 supported at an elevated height within the outer cylinder 122 and the cylinders positioned in the support structure 12 (FIG. 1) a mouse may ascent to the top of the support structure 12 and begin entry into the inner cylinder 120 through the aperture 130. Upon noticing and smelling the bait (not shown) positioned in the lower end of the outer cylinder 122 the mouse will proceed downward toward the lower leg 167 of the trigger. Due to the lower end of the aperture 130 being positioned vertically above the upper end of the outer container 124, the mouse during entry into the trap is prevented from engaging the outer container 122 or the box-like support structure 12 while contacting the trigger leg 167 and thus is supported solely upon the inner cylinder 120. Further, due to the deflector 156 of the end cap 144 extending downward over the upper end of the opening 130, the rodent's tail (not shown) which extends vertically upward during entry into the cylinder 120 will contact the lower end of the deflector 156 and be guided into the inner cylinder 120 as it falls thus preventing the mouse's tail from being caught between the bead 128 and the sealing flange 150.

Upon complete entry of the rodent into the inner cylinder 120, the rodent contacts the plural peg members 168 of the horizontal leg of the trigger 160. Due to the substantial mechanical advantage made possible by the length of the horizontal leg of the trigger 160, the weight of the mouse causes the horizontal leg to pivot downward from its full line position to the phantom line position illustrated in FIG. 6. During this downward pivotal movement of the horizontal leg, the elongate section 172 of the vertical leg of the trigger mechanism flexes or buckles about the hinge section 166 and moves to the phantom line position shown in FIG. 6 wherein the latch 164 reciprocates radially inward off of the stop member 162. The weight of the mouse and cylinder immediately causes the inner cylinder 120 to fall downward within the outer cylinder 122, with the downward movement being guided by the registry of the stop member 126 within the guide aperture 136 of the guide channel 132.

Continued falling movement of the inner cylinder 120 within the outer cylinder 122 causes the lowermost end of the sealing flange 150 of the cover 144 to contact the bead rim 128 formed on the upper end of the enlarged diameter flange section 126. Due to the inertia generated during the falling movement and the relatively thin cross-section of the sealing flange 150, upon contact therewith the sealing flange 150 cams against the bead rim 128 and flexes radially inward, permitting the bead rim 128 to enter into the annular recess 152 formed in the flange 150. As best shown in FIG. 9, by entry of the bead rim 128 within the recess 152, an air-tight seal is formed between the end closure or cover 144 and outer cylinder 122. This air-tight seal provides an effective air lock which prevents the ingress of oxygen within the outer cylinder 122 and prohibits heat transfer into the atmosphere from the rodent's body, which after sufficient period of time kills the rodent within the trap. As with the first embodiment, the second embodiment is preferably disposable in nature and may be discarded with the rodent therein without the user viewing the unsightly carcess. However, alternatively, a user may manually reciprocate the inner cylinder 120 upward within the outer cylinder 122 to remove the rodent from the opening 130, thereby permitting multiple use of the trap.

Thus, in summary the present invention provides a low-cost disposable rodent trap which does not pose a threat of injury to a user or small children and can be conveniently utilized without any adverse effect upon the environment.

I claim:

1. A rodent trap comprising:
a pair of telescoping members, each having an open end and a closed end, said open end of one of said members positioned within the open end of the other of said members;
an opening formed in one of said members to permit ingress of a rodent into the region defined between the closed ends of said pair of members;
trigger means mounted to one of said members for releaseably supporting the open end of one of said members at a distance spaced from the closed end of the other of said members; and
an end cap positioned on the closed end of said one of said members, said end cap sized to cover the open end of said other of said members, said end cap including a pliable gel positioned on one of its surfaces to sealingly engage said open end of said other member for sealing closed said opening and forming a substantially air-tight air lock in said region when said open end of said one of said members is released to collapse said telescoping members together in response to actuation of said trigger means.

2. The rodent trap of claim 1 wherein said members are tubular members and said trigger means comprises a thin plate pivotally mounted to said one of said tubular members including a latch member sized to extend a short distance outboard of said one of said tubular members to releasably engage a tab positioned on the other of said tubular members, said latching member connected to said thin plate to retract out of engagement with said tab in response to pivotable movement of said thin plate.

3. A rodent trap comprising:
a pair of tubular telescoping members each having an open end and a closed end, said open end of one of said members positioned within the open end of the other of said members and the axes of said pair of members vertically oriented in the use of said trap with said one member spaced above the other of said members for relative telescoping movement;
an opening formed in said one of said tubular members to permit ingress of a rodent into the region defined between the closed ends of said pair of tubular members;
trigger means comprising a thin plate pivotally mounted to said one of said tubular members and a latching member having a length sufficient to extend a short distance outboard of the exterior surface of said one of said tubular members to selectively engage a stop positioned upon the interior of the other of said tubular members, said latching member mounted to said one of said tubular members to reciprocate inward toward the interior of said one of said tubular members, said latching member releaseably supporting the open end of said one tubular member at an elevated height within said other tubular member;

connecting means between said plate and said latching member for reciprocating said latching member out of engagement with said stop in response to downward pivotal movement of said plate in response to weight applied thereto for effecting release of said one tubular member to cause said one tubular member to fall with respect to said other tubular member; and means for sealing closed said opening and forming a substantially air-tight air lock in said region when said open end of said one of said tubular members is released to collapse said telescoping tubular members together in response to actuation of said trigger means by reciprocating said latching member out of engagement with said stop.

4. The rodent trap of claim 3 wherein said latching member comprises an integral portion of said thin plate disposed in a plane substantially parallel to the plane of said thin plate.

5. The rodent trap of claim 4 wherein said connecting means comprises an integral portion of said plate angularly oriented between one end of said latching member and said thin plate.

6. A mousetrap comprising:
a first and second tubular member positioned for relative telescoping movement, said first tubular member having a substantially T-shaped channel extending axially along the length of said first tubular member;

an opening formed in said first tubular member for permitting ingress of a mouse into the interior of said first tubular member;

trigger means pivotally mounted to said first tubular member and selectively engageable with a stop formed on said second tubular member for releasably supporting said first tubular member at an elevated height from said second tubular member; and means guided by the T-shaped channel in said first tubular member for closing said opening when said first tubular member is released from said elevated height in response to actuation of said trigger means.

7. The mouse trap of claim 6 wherein said trigger means comprises a lever having one leg reciprocally mounted within a portion of said T-shaped channel and the other leg disposed in a plane generally parallel to the axis of said first tubular member.

8. The mouse trap of claim 7 wherein said latch is positioned on said one leg of said lever and said one leg of said lever includes means for permitting said latch to retract from said stop in response to downward pivotal movement of said other leg of said lever.

* * * * *